United States Patent [19]

Howard

[11] Patent Number: 5,536,028
[45] Date of Patent: Jul. 16, 1996

[54] POWER CENTERING COMPENSATOR FOR VEHICLE STEERING SYSTEMS

[76] Inventor: Durrell U. Howard, 306 Krameria Dr., San Antonio, Tex. 78213

[21] Appl. No.: 314,514

[22] Filed: Sep. 28, 1994

[51] Int. Cl.⁶ .................................................. B62D 7/22
[52] U.S. Cl. ............................. 280/90; 280/94; 138/30
[58] Field of Search .................................. 180/132, 142, 180/141, 143; 280/94, 90, 93, 268, 270, 271; 138/30

[56] References Cited

U.S. PATENT DOCUMENTS

| | | |
|---|---|---|
| 2,509,570 | 5/1950 | Lee . |
| 2,760,518 | 8/1956 | Peet . |
| 3,075,576 | 1/1963 | Herbert . |
| 3,169,551 | 2/1965 | Lewis . |
| 3,230,975 | 1/1966 | Mercier . |
| 3,318,251 | 5/1967 | Smith . |
| 3,730,307 | 5/1973 | Mitchell . |
| 3,756,367 | 9/1973 | Mitchell et al. . |
| 3,792,721 | 2/1974 | Zahid . |
| 3,857,413 | 12/1974 | Zahid . |
| 3,863,947 | 2/1975 | Weston . |
| 3,870,335 | 3/1975 | Schulz . |
| 3,882,953 | 5/1975 | Maisch . |
| 3,882,954 | 5/1975 | Inoue . |
| 3,887,027 | 6/1975 | Allison . |
| 3,897,846 | 8/1975 | Inoue . |
| 3,958,656 | 3/1976 | Niemann . |
| 3,960,179 | 6/1976 | Zahid . |
| 3,961,646 | 6/1976 | Schon . |
| 4,088,154 | 5/1978 | Patton et al. ............... 138/30 |
| 4,349,079 | 9/1982 | Leiber . |
| 4,359,123 | 11/1982 | Haupt et al. . |
| 4,410,193 | 10/1983 | Howard ..................... 280/90 |
| 4,418,931 | 12/1983 | Howard ..................... 280/94 |
| 4,467,884 | 8/1984 | Robertson et al. . |
| 4,503,678 | 3/1985 | Wimbush . |
| 4,506,507 | 3/1985 | Wimbush . |
| 4,534,577 | 8/1985 | Howard . |
| 4,566,712 | 1/1986 | Motrenec . |
| 4,585,400 | 4/1986 | Miller . |
| 4,588,198 | 5/1986 | Kanazawa et al. . |
| 4,634,135 | 1/1987 | Nakata et al. . |
| 4,638,838 | 1/1987 | Richard et al. . |
| 4,722,545 | 2/1988 | Gretz et al. . |
| 4,828,063 | 5/1989 | Ogura et al. . |
| 4,872,486 | 10/1989 | Sugimura et al. ............... 138/30 |
| 4,903,973 | 2/1990 | Bray . |

FOREIGN PATENT DOCUMENTS

1901588  6/1979  Germany ........................... 180/132

Primary Examiner—Karin L. Tyson
Attorney, Agent, or Firm—Pollock, Vande Sande & Priddy

[57] ABSTRACT

A power centering apparatus for resisting off-center movement of the steered wheels of a vehicle and returning them to a selected center position after each such movement. The apparatus includes a centering unit for providing the resistance to off-center movement and a trimming unit for varying the center position. The resistance unit includes a linkage extending between the steering system and a fixed vehicle member, and the trimming unit has a trim piston movable relative to a trim cylinder to vary the center position by changing the length of the linkage. A plurality of passages and check valves make the trimming unit operable by a single solenoid valve to supply gas free liquid to and remove gas contaminated liquid from trim chambers on opposite sides of the trim piston without intermixing these two liquids. An annular liquid reservoir is formed in an accumulator by a solid outer wall concentric with a flexible inner wall and permits gas to be separated from returned liquid and pressurized liquid to be supplied to the centering unit. The resistance may be varied remotely and may be greater than a return force for returning the steered wheels to center after off-center movement.

28 Claims, 4 Drawing Sheets

FIG_2

POWER CENTERING COMPENSATOR FOR VEHICLE STEERING SYSTEMS

FIELD OF THE INVENTION

This invention relates to vehicle steering systems and more particularly to a centering device for controlling the steerable wheels of a vehicle such as a motor home, bus, truck, automobile or the like so that a center steering position is selected and maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist normal steering inputs away from center, including those of the driver. Intentional turning maneuvers by the driver therefore require sufficient turning force to overcome this positive resistance to movement away from center. When the driver relaxes the turning force applied to the steering wheel, a positive caster system has a definite tendency to return to its straight ahead position, although it may overshoot the neutral or center position if the steering wheel is entirely released.

However, with such conventional steering, the smallest amount of erratic steerable wheel movement is passed on directly to the driver who must provide counter-active corrections through the steering wheel. The negative action of the steerable wheels is caused by spurious steering inputs from crosswinds, slanted or crown roads, bad road surfaces, and other adverse dynamic steering forces. Inherent geometric steering characteristics may also be responsible for spurious steering inputs.

In other words, when the steered wheels are not able to hold a straight line, the problem is passed back through the system for driver correction. The result of such unruly behavior of the steerable wheels is known as "road wander". Heavy vehicle drivers know about road wander, crosswind steering, and steering wheel pull; and so does every front end specialist who must endeavor to solve these built-in problems.

While positive caster is desirable in some respects, it is not without compromises over the full steering spectrum. For example, the adverse effects of strong gusty cross winds are usually more pronounced with positive caster. As its name would imply, the vehicle tends to caster towards the side of the roadway to which it is being pushed by the wind. Similarly, a high crown at the center of the roadway or a slanted roadway can cause vehicles to turn toward the edge of the roadway, that is, in the downhill direction. In addition, generous positive caster provides significant resistance to small radius turns, which can make city driving quite fatiguing. These three adverse effects are some of the negative aspects of achieving steering stability through generous amounts of positive caster.

On the plus side, motor vehicles with positive caster are less fatiguing to drive over long distances and are safer and more controllable at highway speeds, as compared to vehicles without caster or with negative caster. This is because, by tracking straight, virtually no driver effort is required to keep a positive caster vehicle from swerving unless one of the foregoing sources of extraneous forces are present.

Another drawback of prior art steering systems is that spurious inputs transmitted from the roadway through the steerable wheels affect substantially the entire steering assembly before encountering any stabilizing resistance from the steering wheel. The transmission of these various inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steerable wheels, and significantly reduces driver fatigue because it results in a major reduction in driver steering inputs. This is accomplished by allowing the driver to easily make small adjustments in the centered position of the steering system to fine tune steering of the vehicle during its operation. Fine tuning can only be made while driving, and makes driving more pleasurable and less fatiguing. It also prevents unnecessary trips to a front-end shop.

The invention thus comprises a power centering compensator having a center position which is remotely adjustable to permit the driver of the vehicle to change and reset the center position of the steering system to compensate for new or changed steering forces which would otherwise cause the vehicle to deviate from its straight ahead course. Such changes in the center position of the steering system may be necessitated by component wear, in addition to changes in the external forces acting upon the vehicle or its steerable wheels as described below. Even a change of tires may necessitate a change in the center position of the steering system to achieve straight ahead travel of the vehicle. Remote adjustment permits the center position maintained by the compensator to be fine tuned while the vehicle is in operation from a location near the driver, which is "remote" relative to the location at which the compensator is connected to the steering system of the vehicle.

When a driver turns the steering wheel of modern over-the-road vehicles, power steering does the work. If these vehicles utilize the present invention and the steering wheel is released, the power centering compensator goes to work and makes the steered wheels track straight with great accuracy by returning them to center and counteracting spurious steering inputs away from center as described below.

Gusty crosswinds cause castered front wheels of a motor vehicle to steer downwind, requiring constant driver corrections. With the power centering compensator to stabilize the front wheels and to hold a straight course, crosswind driving is dramatically improved. In addition, use of the compensator permits a substantial reduction in the caster angle of vehicles with positive caster, thereby significantly reducing the crosswind effect.

When driving on a crowned or slanted road, the driver must hold against wheel pull mile after mile. The culprit here is the hundred year old steering geometry that is responsible for the automatic, never failing pull to the low side of the roadway. With the present invention, the driver easily trims out such steering wheel pull by the simple touch of a trim switch.

Because of their high-roll center dynamics, trucks, buses, motorhomes and other large vehicles are especially susceptible to a condition known as "dynamic sway". Dynamic sway is caused by steered wheels that will not hold a straight line because of vehicle geometry. Attempts to solve this steering problem have universally been made by making the chassis stiffer in the roll axis. However, there are practical limits to how rigid the roll axis can be made. There are no limits, however, to how straight a vehicle can be made to track. With the stabilized, on-center, straight track steering provided by the present invention, the ultimate in sway control can be achieved. The reduction in the sway of buses and motorhomes means that passengers can move about without being thrown off balance, and those with a tendency for motion sickness will be more able to enjoy the pleasures of road vehicle travel.

Road wander is similar to dynamic sway in that it is caused by steered wheels that are not holding a dedicated straight line. It may be caused by wear or slack in the steering system and, where power steering is used, because of dead space travel of the power steering valve before it opens the fluid ports of the power steering unit. When the steered wheels wander, the problem is passed on to the driver causing constant steering corrections. This problem is also cured by the present invention which provides precision centered steerable wheels that track super straight, preventing unstable wheel behavior that causes road wander. The invention is also capable of generating sufficient compensating forces to properly control steering with offset wheels having oversized tires.

The power centering compensator of the invention provides remotely adjustable levels of resistance force for opposing off-center steering movements and of centering force for returning the steering system to its center position after a turning movement. The adjustment means also provides for different levels of steering force to initiate or breakaway into a steering movement away from center. This level of force is sometimes referred to in this specification as the "break away resistance". Different levels of break away resistance and of resistance force may be appropriate to compensate for different steering system characteristics on the same or different types of vehicles and/or for changes in the forces acting upon the vehicle. The level of break away resistance and of resistance force opposing movement away from center may be remotely adjusted either by a control mechanism operable by the driver or by a speed control mechanism responsive to the speed of the vehicle.

The power centering force for returning the steering system to center may also be remotely adjusted either by a control mechanism operable by the driver or by a speed control mechanism responsive to the speed of the vehicle. In the present invention, the level of this return force may be the same as or may differ from the resistance force level. Both the resistance force and the return force provided by the compensator are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The power centering compensator may be left on continuously because it will automatically turn off with the ignition and come back on when the engine is started. With any malfunction of the vehicle's power steering, an automatic disabling feature of the invention shuts the compensator completely off.

In order to effectively resist spurious wheel movements and prevent such spurious inputs from reaching the steering gear and other steering components located between the tie rod and the steering wheel, the compensator of the present invention is connected downstream of the steering gear on the slow side of its ratio. The steerable wheels are therefore maintained in their straight ahead position irrespective of any spurious inputs or mechanical slack that may be present in the upstream, fast ratio portion of the steering assembly. In the absence of the compensator, such spurious inputs to and/or mechanical slack in the steering assembly require almost constant manipulation of the steering wheel by the driver and make it almost impossible for the driver to hold the vehicle on a true straight ahead course.

To properly compensate for the various adverse steering forces and inputs that may be encountered during operation of a vehicle, the power centering compensator of the present invention therefore includes the following features:

(a) Dynamic resistance force opposing turning movement away from either side of a selected center position, the amount of resistance force being sufficiently large to prevent such turning moments in response to spurious inputs from either the steerable wheels or the steering wheel but sufficiently small to allow intentionally created turning inputs to be transmitted from the steering wheel to the steerable wheels.

(b) Dynamic return force toward the center position from either side of center, the amount of return force from either side of center being sufficiently large to override spurious steering inputs tending to cause turning movements away from center.

(c) Remotely operated means for initializing and varying the resistance force and the return force to permit the driver to selectively activate and fine tune these forces while the vehicle is in operation so as to satisfy driver road feel preferences and to adequately compensate for changes in driving conditions and steering system characteristics.

(d) Remotely operated trimming means to permit the driver to selectively vary and fine tune the selected center position with great accuracy while the vehicle is in operation so as to precisely compensate for changes in driving conditions and steering system characteristics tending to alter forward movement of the vehicle away from a true straight ahead course.

(e) Precision centering with no substantial overshoot past center when the steering system returns to the selected center position.

(f) Free return to the center position from either side of center.

(g) Fail-safe mode for rendering the power centering compensator inoperative so that it in no way affects movement of the steering system if the vehicle's power steering unit has failed or is otherwise inoperative.

(h) Precision centering independent of mechanical slack in the reduction gear, power steering unit, and/or other steering system components between the tie rod and the steering wheel.

(i) Slack-free trimming of center position.

(j) Viscous dampening of erratic steering movements, such as those caused by a tire blowout.

(k) Retrofitting of existing vehicles.

(l) Relatively little space required for installation.

(m) Centering assistance for vehicles with or without power steering systems.

(n) Resistance and return forces through a predetermined range of turning movement to either side of the center position.

(o) Distinctive driver road feel, including a sufficient feel through the steering wheel to let the driver know when the steered wheels are beginning to move away from center and are closely approaching return to center.

The preferred embodiments of the invention therefore have the features (a) through (o) listed above, namely, resistance force for opposing steering movement away from center and return force for return to center sufficient to overcome spurious steering inputs, remotely variable level of resistance force and return force through a predetermined range of turning movement, remotely trimmable center position, no substantial overshoot, free return to center position, fail-safe mode for disabling the compensator in the absence of power steering, precision and slack-free centering, slack free trimming, dampening of erratic steering movements, compact size, utility for old and new vehicles with or without power steering, and distinctive driver road feel.

It follows that a principal object of the present invention is to provide a power centering compensator having the foregoing features and attachable to a vehicle steering system to reduce automatically the driver inputs required to maintain a preselected straight ahead course for the vehicle. To accomplish this, the present invention offsets spurious steering inputs with an opposing resistance force sufficient to keep the steerable wheels or other steering member in a selected center position for maintaining straight ahead vehicle travel. Accurately holding the steerable wheels on center prevents road wander, slanted road steering wheel pull, steering over-control, crosswind steering effect, and steering induced dynamic sway. Improvement in rutted road steering may also be realized. In addition, the positive centering feature gives the steering system designer greater latitude in reducing the caster angle of the king pin, which reduces the crosswind steering effect.

The manner in which the present invention accomplishes the foregoing objectives and advantages will now be described. The resistance force is provided by a zero backlash hydraulic centering assembly that includes a piston rod which is preferably attached either to the steering gear pitman arm or directly to the steering system tie rod. The assembly comprises a centering cylinder containing two pistons having rest positions against a center stop that holds an enlarged head of the piston rod captive in an on-center position. When the steered wheels are turned away from center, one of the pistons is displaced by the piston rod head. When the driver releases the steering wheel, the displaced piston returns the piston rod head and the steering system to their on-center positions. A hydraulic pressure source maintains substantial pressure in cylinder chambers on one side of each piston and this pressure causes the captured piston rod head to keep the steered wheels on center, tracking with accuracy that is not achieved with any other method.

The hydraulic pressure source is preferably an air over hydraulic pressure accumulator that includes a reservoir for the hydraulic fluid. Air pressure from a pressurized air source, such as an onboard compressor, a vehicle airbrake system or some other conventional air pressure source, is regulated by a control on the driver control panel. The accumulator has a flexible diaphragm that defines separate air and liquid chambers. By selectively varying the pressure within the air chamber, hydraulic fluid pressure and resulting forces applied to the dual pistons are varied, thereby varying the resistance to off-center movement of the steering system, as well as the return force for recentering the steering system. A pressure relief valve may communicate with the air chamber side of the accumulator to provide an upper limit to the resistance and return forces that may be generated by contact between the respective pistons and the piston rod head therebetween.

The pressure accumulator is protected from moisture by suitable air filters and/or dryers. Dual electric pneumatic valves, one on top and one on the bottom of the accumulator, automatically dump the air pressure when the system is turned off. The air pressure in the accumulator is automatically recharged each time the system is turned on, thereby eliminating a recharge maintenance function. On systems supplied by an air compressor, the discharge from the upper accumulator dump valve may be routed to the compressor inlet filter for providing a backflush function to keep this compressor filter clean.

It is also within the scope of the present invention to pressurize the centering cylinder using other liquid or air pressurization systems. For example, a pressure accumulator system of the type described in my prior U.S. Pat. No. 4,410,193 may be employed for storing and providing hydraulic fluid under pressure to the centering cylinder. The turning resistance of the present invention is therefore provided by delivering fluid under pressure to the centering cylinder from a fluid pressure accumulator which may take a variety of forms and may be hydraulic, pneumatic or a combination of both. A pressure control device permits the level of resistance to movement away from center and the level of return force to be controllably varied, either by a hand mechanism operable by the driver or by a speed control mechanism responsive to the speed of the vehicle. In a preferred embodiment of the invention, the centering cylinder is preferably pressurized by liquid from the accumulator, and liquid in the accumulator is preferably pressurized by an air system of the vehicle.

Regardless of the type of fluid pressurization system employed, the system should generate sufficient pressure to return the respective centering pistons to their center rest positions against the central centering stop of the centering cylinder upon cessation of intentional steering inputs. The pressurization system should also constantly bias the centering pistons into engagement with both the centering stop and the piston rod head at all times when the compensator is activated and in its center position so that there is no slack in the compensator linkages at any time during its operation.

Spurious steering inputs tending to move the tie rod in either direction are therefore resisted by a corresponding resistance force generated by interaction between a corresponding piston and the piston rod head. Only when intentional steering wheel forces exceed a selected break away level will the tie rod of the steering system generate sufficient linear force on the piston rod to cause its head to move off center along with the piston corresponding to the direction of the desired turning movement.

After linear movement of the piston head is initiated, the steering force required to sustain movement is a function of the pressure in the accumulator, as well as of other centering phenomena acting on the steering system, such as positive wheel caster. For lighter vehicles, such as automobiles and pickup trucks, the accumulator pressure and other compensator parameters may be chosen so that a linear break away steering force of at least about 50 pounds, preferably at least about 100 pounds, and more preferably at least about 150 pounds, must be applied to the tie rod by the pitman arm in order to initiate a break away turning movement of the steerable wheels. For heavier vehicles, such as eighteen wheel trucks and motor homes, these parameters may be chosen to require a linear break away steering force of at least about 200 pounds, preferably at least about 300 pounds, and more preferably at least about 350 pounds. After break away, accumulator pressure acting on the off-center piston provides a return force that is effective over the entire range of turning angles, which for highway vehicles is usually limited to about 45° on either side of the center wheel position (the 0° position).

Another important feature of the present invention is the provision of a remotely operable trimming means for controllably varying the selected center position of the steerable member to be maintained by the compensator. In particular, a trim rod connected to a trim piston is reciprocally carried within a hydraulic trim cylinder and the distal end of the trim rod is pivotally mounted on the vehicle frame. Hydraulic fluid from the fluid system accumulator is supplied to opposite sides of the trim piston and its flow is controlled by a trim valve means operated by a single solenoid to allow movement of the trim piston and its rod. A liquid trimming fluid is preferred because it is substantially incompressible as compared to a gaseous trimming fluid and therefore provides the capability of locking the trim piston in its trimmed position without appreciable slack.

The trim cylinder is separate from, but integrally attached to, one end of the centering cylinder. The trim piston in the trim cylinder preferably has a stroke of less than one inch, more preferably about one-half inch, and the hydraulic fluid in this short trim cylinder is trapped on opposite sides of the trim piston by the trim valve, creating a hydraulic lock that holds the centering stop of the centering cylinder in a selected on-center position. When an electric trim button is activated, the solenoid operated trim valve opens, allowing fluid to pass from one side of the trim piston to the other. This causes the centering cylinder (and its centering stop) to move precisely by the amount necessary to coincide with the straight ahead direction that the vehicle is being steered. Releasing the trim button allows the solenoid valve to close, recreating a hydraulic lock in the trim cylinder to hold the centering assembly in the new on-center position to which it has been trimmed. The average trim corrections may be on the order of a few one-thousandths of an inch.

When trimming the system, the driver therefore holds the steering wheel to establish an on-center straight ahead position. Holding this on-center position, the trim button is held down for a few seconds, allowing relative movement between the trim cylinder and the trim piston, which in turn causes the centering cylinder to move automatically to a new on-center steering position with both centering pistons seated against the centering stop. Trimming the system is therefore an easy and natural driving function. Should the driver sense a degree of steering wheel pull that becomes a bother, it is then quickly eliminated by pressing the trim switch.

The tolerance for backlash (rebound) or drift in either direction of the trim piston in the trim cylinder is preferably held to one-thousandth of an inch. This close tolerance is achieved in several ways. The liquid chamber of the accumulator is connected to the trimming assembly by separate fluid supply and return conduits, and the trim assembly is provided with a series of interrelated check valves and is positioned below the accumulator. This helps to insure that fresh, bubble free fluid is supplied to the trimming assembly by the accumulator, and that used fluid, which may contain gas bubbles, is returned directly to the accumulator without any chance of passing back into the trimming cylinder. To further insure that the supply line is bubble free, the liquid chamber of the accumulator is an annular reservoir and the return inlet to and the supply outlet from this reservoir are spaced peripherally apart around the annulus thereof, preferably by at least about 90°, more preferably by at least about 135° and most preferably by about 180°. This insures precision trimming without backlash or drift of the center position, which otherwise could be caused by gas bubbles in the trimming cylinder.

The foregoing features also eliminate the need for a service air bleeding operation after the system is filled with original or replacement hydraulic fluid. In other words, the invention comprises a self-bleeding means that assures a bubble-free system capable of holding a close centering tolerance automatically. This self-bleeding means includes the series of check valves that are arranged to allow only bubble-free fluid to enter the trim cylinder. During trimming operations, all fluid that exits the trim cylinder returns to the accumulator reservoir via a return flow path that is isolated from the supply flow path. While it may not always be necessary to supply bubble free hydraulic fluid to the centering cylinder, one embodiment of the invention insures that bubble free liquid is also supplied to the centering cylinder to help insure precision, slack-free centering.

A driver control panel makes it possible for steering corrections to be made while driving. The panel may be conveniently located near the driver and provides three basic functions, namely, a switch to turn the system on and off, a centering effectiveness control and gauge, and a momentary trim switch. Activating and adjusting the centering force and trimming the centering system is therefore an easy and natural driving function. Should the driver sense a degree of steering wheel pull that becomes a bother, it is then quickly eliminated by pressing the trim switch.

The invention provides a distinctive feel when approaching or leaving the center position. Thus, the sense of touch is added to the visual sense to aid control of the vehicle and reduce driver fatigue. A turning resistance of at least about 20 pounds, preferably about 30 to about 150 pounds, should be available at the tie rod for small turning angles away from center, preferably 0°–5°, more preferably 0°– 3°, and most preferably within one degree on either side of center. The turning resistance selected should satisfy the road feel desired by the driver and be sufficient to overcome anticipated spurious inputs.

When connected to weak or soft steering systems, i.e. those with no or negative caster, the invention thus provides the driver with a positive touch control not heretofore attainable with those types of systems. Positive stability is thereby achieved for previously unstable steering systems.

Although the present invention is particularly useful as a power centering mechanism for large motor vehicles, it can be employed to position any steerable member moveable to either side of a preselected position. For example, the compensator can keep an outboard motor centered so that a boat follows a straight course over the water in the presence of spurious steering forces produced by wind and wave action. The compensator can also be used to center such steerable members as the rudders of ships or airplanes and the tongues of tandem trailers or railway cars. The compensator is useable with both power and non-powered steering systems, with the level of compensating forces provided usually being less for vehicles without power steering.

The invention may be used with steering systems having a reduction gear between the steering wheel and the steerable wheels. In this application, the compensator is preferably connected to the steering system at a location between the steerable wheels and the reduction gear so as to be unaffected by any slack in the reduction gear or in components and connections between the reduction gear and the steering wheel.

The compensator is preferably connected between the steering system and the front axle or a frame member of the vehicle in a position that allows the steerable member to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the steering gear. The frame connection may be made to any component serving as a fixed mounting relative to the steering system. This fixed component may be a frame member, or an axle or some other part carried by the vehicle frame instead of an actual frame member.

The apparatus includes control means for remotely and selectively varying both the amount of resistance to movement away from center and the selected center position of the steerable member(s) relative to the vehicle frame. Both of these remote adjustments are preferably made by the driver while the vehicle is in operation. Therefore, electrical control and fluid control systems are employed for remotely operating the centering and trimming units of the centering compensator. The controls for actuating the control systems are preferably located at the driver's station of the vehicle. The electrical controls may comprise one or more switches preferably having a toggle design that is spring-biased to a circuit-open position. Such switches are closed only momentarily when the toggle is held in a depressed position against the spring bias. Thus, the adjusting means, such as a solenoid, is actuated only while the toggle is depressed. Release of the toggle opens the circuit and stops the adjustment at the point selected.

My earlier U.S. Pat. No. 4,410,193, No. 4,418,931, and No. 4,534,577, the entire contents of which are expressly incorporated herein by reference, solved many of the shortcomings existing in the prior art. The present invention provides improvements over these earlier patents, especially in the areas of simplicity, precision, and reliability.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF THE INVENTION

Figure 1:
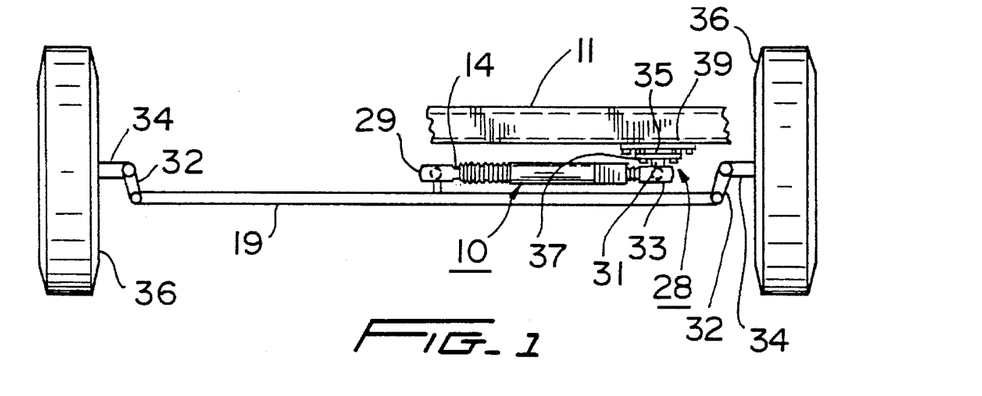
FIG. 1 is a plan view illustrating installation of the invention between the frame and steering system of a motor vehicle.

The power centering system of the present invention comprises a power centering compensator, generally designated 10, which may be connected between a front axile 11 and the tie rod 19 of a conventional motor vehicle as shown in FIG. 1 of the drawings. The steering system components shown are conventional and include bell cranks 32—32 carried by knuckles 34—34 which support steerable wheels 36—36 for pivotable turning movement about kingpins (not shown) mounted on the vehicle frame. Steering inputs by the driver are transmitted to the tie rod 19 by the pitman arm (not shown) of the steering gear. The outer end of a centering rod 14 of compensator 10 is connected to the tie rod 19 by means of a ball joint 29 connected to the outer rod end by a universal connection 31 threaded thereon (FIG. 2).

Figure 2:
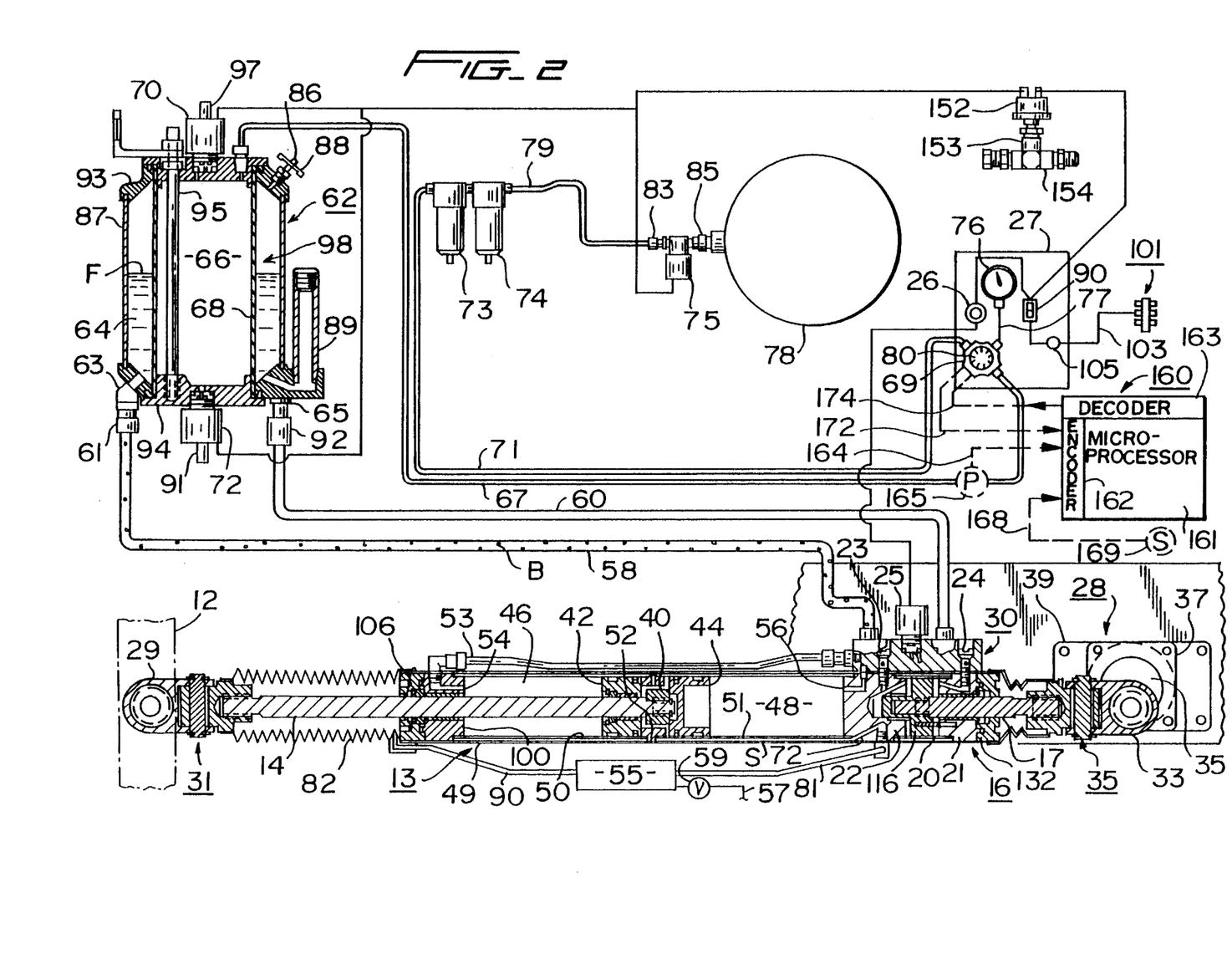
FIG. 2 is a schematic diagram of the fluid and electrical systems and of the major components of the invention, and includes sectional views showing structural details of the accumulator, the steering cylinder assembly and the trim cylinder assembly.
Figure 3:
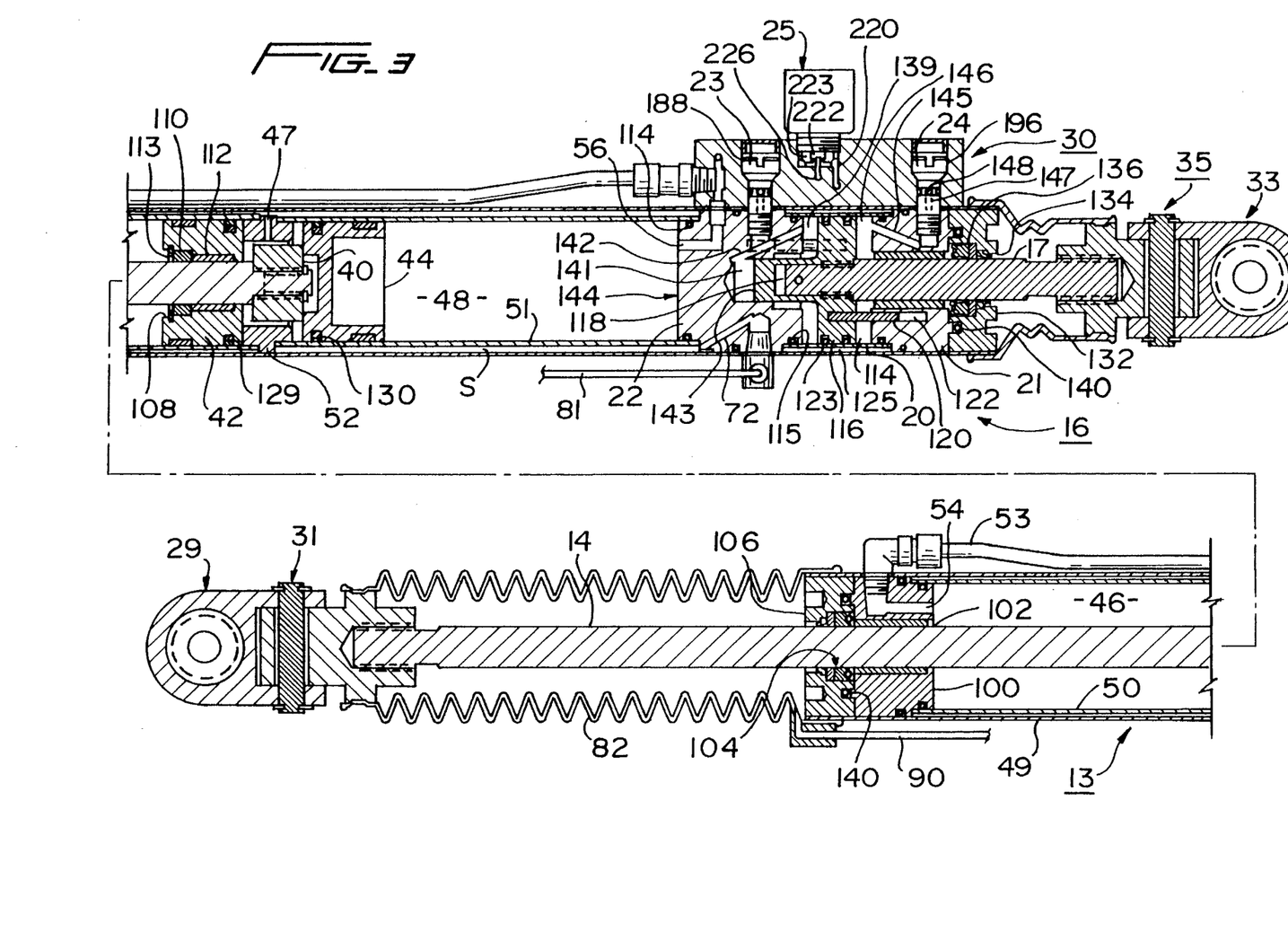
FIG. 3 is an enlarged partial sectional view of the steering and trim cylinder assemblies of FIG. 2.

As may be seen best in FIGS. 2 and 3, the power centering compensator includes a centering unit 13 having the centering rod 14 extending outward from one end and a trimming unit 16 at the other end. The trimming unit 16 includes a trim cylinder 20 having an end head 21 and an intermediate head 22, and a trim valve assembly 30 secured to heads 21 and 22 by bolts 23 and 24, respectively, each having an axial fluid bore 147 communicating with a plurality of radial ports 148. The trim valve 30 is actuated by a solenoid 25 in response to a driver of the vehicle pushing a trim button 26 on a control panel 27, which is preferably located at or near the driver's station of the vehicle.

The trimming unit 16 also includes a trim rod 17 connected to the axle 11 by means of a mounting bracket 28 which carries the ball element of a ball joint 33 connected to the outer end of trim rod 17 by a universal connection 35 threaded thereon. The ball joints 29 and 33 permit pivotal movement in the vertical plane and to a limited extent in the horizontal plane, and are conventional joints wherein an enlarged spherical end on a rod or stub is held for pivotable movement within a surrounding journal structure carried by an arm-like member. The stub 31 of ball joint 33 is mounted off-center on a circular plate 35 of bracket 28 and plate 35 is clamped by bolts between the opposing faces of two additional plates 37 and 39 such that rotation of plate 35 when the bolts are loose provides an overall adjustment of the nominal center distance between mounting bracket 28 and the tie rod connection at ball joint 29.

The components of the centering system and the way in which they center and stabilize a vehicle steering system will now be described. It is to be understood that each of the components described are connected together by appropriately sized fluid conduits and electrical wires and that these conduits and wires are represented by the lines interconnecting the components as shown.

Referring to FIGS. 2 and 3, there is shown a specific structural arrangement of the components preferably incorporated in or attached directly to the centering unit 13. A centering cylinder housing 49 encloses two separate interior cylinders 50 and 51, the adjacent ends of which are connected together by a collar 52. The cylinders 50 and 51 contain centering pistons 42 and 44, respectively. An enlarged rod head 40 is keyed and fastened to the inner end of centering rod 14. Head 40 is positioned between opposing faces of pistons 42 and 44 and serves as the actuator for these pistons.

A breather port 47 is provided by collar 52 to allow air to enter and leave the space between pistons 42 and 44 as they reciprocate in cylinders 50 and 51. Port 47 vents to an annular space S between the exterior of cylinders 50 and 51 and the interior of housing 49. In turn, the annular space S vents via a trim housing passage 72 and a breather line 81 to a vent reservoir 55 having a drain line 57 containing a stop valve 59. The end portion of centering rod 14 projecting beyond cylinder housing 49 is surrounded by a dirt and grease barrier in the form of a flexible bellows 82 which is also vented to the vent reservoir 55 by a breather line 90. Since air flows back and forth in breather lines 81 and 90, stop valve 59 may normally be closed.

The end of cylinder 50 opposite to collar 52 is closed by a head 100 having a journaled and sealed aperture 102 for sliding passage of centering rod 14. A set of multiple seals 104 and the head 100 are secured in place by an end cap 106 threaded or crimped into the cylinder housing 49. Piston 42 has a sealed aperture 108 for sliding passage of rod 14 during its movement of piston 44. A piston rod seal 110 and journal 112 are secured in piston 42 by a snap ring 113. The end of cylinder 51 opposite to collar 52 is closed by the intermediate head 22 of trim cylinder 20 and these two cylinders are secured together by crimping at positions beyond seal rings 114 and 115, respectively. Centering piston 44 is shown moved slightly by piston head 40 and centering piston 42 is shown in its fully retracted position. Both pistons are arranged for compressive movement toward the opposite ends of their respective chambers, piston 42 traveling in chamber 46 and piston 44 traveling in chamber 48 within cylinders 50 and 51, respectively.

The retracted position of each piston is defined by the internal annular collar 52 which serves as a piston stop and preferably has an axial width substantially (preferably within one-ten thousandth of an inch) equal to the axial thickness of rod head 40. A stop width greater than the head thickness is undesirable because gaps between opposing surfaces would allow unbiased movement (slack) between rod 14 and cylinders 50 and 51. A stop width less than the head thickness is also undesirable because this would let fluid flow back and forth between chambers 46 and 48 through a connecting conduit 53 so that the pistons 42 and 44 would move together until one of them bottoms out against the collar 52, there being no pressure differential applied to the rod head during such joint piston movement.

Near the end of each centering chamber opposite to the retracted piston position is a single port for communicating fluid pressure to the chamber, port 54 serving chamber 46 and port 56 serving chamber 48. Ports 54 and 56 are connected together by the conduit 53, which in turn is connected via the trim valve assembly 30 and hydraulic conduits 58 and 60 to an accumulator 62, which provides hydraulic fluid under pressure to the centering chambers 46 and 48.

The vehicle steering system is properly centered when pistons 42 and 44 abut collar 52. In order to move or break away from collar 52, these pistons must overcome the resistance provided by accumulator pressure acting through the supply line 60, which preferably contains an in-line filter 92. An important feature of the centering unit is the difference in diameters between cylinders 50 and 51, the diameter of cylinder 50 being larger by an amount sufficient to produce equal centering forces on pistons 42 and 44 in spite of the area of piston 42 lost because the centering rod 14 passes therethrough. Thus, to provide equal working areas, the cross-sectional area of cylinder 50 and the annular surface area of piston 42 are greater than the corresponding areas of cylinder 51 and piston 44 by the amount of piston area lost by reason of rod aperture 108 in piston 42.

The accumulator 62 has an annular liquid chamber 64, a central gas chamber 66 separated from the liquid chamber by a flexible bladder 68, and solenoid operated upper and lower gas dump valves 70 and 72. Bladder 68 is preferably made of neoprene. Accumulator 62 also includes an upper head 93 and a lower head 94 spaced apart by an outer housing wall 87 and secured together by peripherally spaced bolts 95, only one of which is shown in FIG. 2. Gas chamber 66 is connected to a compressed gas source 78 via a conduit 67, a pressure regulator 69, a conduit 71, a dryer 73, a particle filter 74, a conduit 79, a check valve 83, a solenoid operated cut-off valve 75, and a restrictor orifice 85 for limiting the flow rate to regulator 69. The gas pressure in chamber 66 is indicated by a pressure gauge 76 which is connected to pressure regulator 69 by a conduit 77. The gas is preferably air, and both the bladder 68 and the surrounding housing wall 87 of accumulator 62 are preferably cylindrical.

Centering cylinders 50 and 51, trim cylinder 20, trim valve 30 and accumulator 62 are positioned relative to each other, and return conduit 58 is arranged, such that any gas bubbles B in the cylinders and trim valve flow through conduit 58 and into the accumulator via an inlet 63. Inlet 63 may be preceded by a check valve 61 for preventing reverse flow of the gas contaminated hydraulic fluid. Upon entering accumulator 62, the gas bubbles B rise to the liquid and gas interface F such that the gas accumulates in an upper portion of liquid chamber 64 where it provides an air cushion 98, which may serve the same purpose as the pressurized gas in chamber 66. An accumulator outlet 65 is spaced from inlet 63 around the peripheral extent of annular chamber 64 by a distance sufficient to insure that only bubble-free liquid reaches supply conduit 60 connected to trim valve 30. Therefore, outlet 65 is positioned from inlet 63 preferably by at least 90°, more preferably about 120°, still more preferably about 150° and most preferably about 180°.

Gas chamber 66 should be large enough for liquid chamber 64 to receive the entire volume of fluid from either chamber 46 or 48 without unduly collapsing bladder 68. A bleed passage 86 containing a normally closed vent cock 88 allows liquid chamber 64 to be partially filled with hydraulic fluid up to the level of the top of a filler neck 89.

Gas pressure in chamber 66 acts through bladder 68 to store fluid energy received from the hydraulic side of the system, and to maintain fluid pressure on the liquid side of the respective pistons 42 and 44 until such time as the gas pressure is released to ambient atmosphere by actuation of dump valves 70 and/or 72 in response to turning off the system with an on-off switch 90. The lower dump valve 72 includes a drain line 91 and has the dual purpose of discharging both gas and any liquid (such as condensed water) accumulating in gas chamber 66. Switch 90 is connected to an electrical buss 101 by a line 103 containing a circuit breaker 105.

As it is best to deactivate compensator 10 in the event of a failure of the power steering system, a switch 152 for interrupting electrical power to solenoid valves 70, 72 and 75 may be provided for vehicles with power steering systems. Switch 152 is mounted on a pressure sensor 153 located in a hydraulic line 154 in fluid communication with the outlet of the power steering pump (not shown). A loss of pressure at the pump outlet causes switch 152 to open, thereby causing gas supply valve 75 to close and dump valves 70 and 72 to open for depressurizing gas chamber 66, which in turn depressurizes liquid chamber 64 and centering chambers 46 and 48 connected thereto. Vent lines 91 and 97 are each preferably of larger capacity than gas supply conduit 67 to ensure that gas chamber 66 will be depressurized even if gas supply valve 75 fails to close and either dump valve 70 or 72 fails to open with the opening of pressure switch 152.

Accumulator 62 allows hydraulic pressure in the centering chambers 46 and 48 to be precisely varied over a relatively wide range because the gas trapped in gas chamber 66 provides a spring-like return force and this chamber may be sized such that the return force does not vary significantly with compressive piston movement. The gas pressure control may comprise a manual throttle valve (not shown) between conduits 71 and 67, in combination with the pressure gauge 76 to indicate accumulator pressure. Alternately, the pressure regulator 69 may be used for maintaining a manually selected system pressure. A selector knob 80 is provided to permit varying the pressure settings of the regulator by hand. By varying the gas pressure in gas chamber 66 through adjusting pressure regulator 69, the break away resistance and the centering return force produced by the compensator of the invention can be increased or decreased as desired. The range of pressures available should be selected so that break away resistance can be varied from relatively low at low speeds to relatively high at high speeds.

As an alternative to manual adjustment, the output pressure of regulator 69 may be adjusted by a reversible electric motor (not shown) controlled by an on-board computer 160, which comprises a microprocessor 161, an encoder 162 and a decoder 163. Encoder 162 converts to digital signals an analog signal 164 input from a pressure sensor 165 in the gas supply conduit 67, an analog signal 168 input from a vehicle speed sensor 169, and an analog signal 172 input from a position sensor (not shown) within regulator 69. Decoder 163 converts digital control signals generated by microprocessor 161 to an analog signal 174 for controlling the reversible electric motor which adjusts the output pressure provided by regulator 69. The gas pressure in gas chamber 66 and the resulting resistance and centering forces are thereby made automatically responsive to the speed of the vehicle to provide "speed sensitive centering" of the vehicle's steering system. It is preferable that the resistance to turning movements away from the center position be increased automatically as the speed of the vehicle increases because the effects of small off-center movements in response to spurious steering inputs increase dramatically with vehicle speed.

Intermediate head 22 engages trim cylinder 20 beyond the end of cylinder 51 and trim cylinder 20 defines a trimming chamber 114 containing a trim piston 116 secured and keyed to the inner end of the trimming rod 17. An intermediate gap 118 is provided for axial adjustment of trim piston 116 relative to the inner end of trimming rod 17. Rotation of trim piston 116 relative to trimming rod 17 is prevented by a pair of guide pins 120 slidable in corresponding slideways 122, one in each of the trim cylinder heads 21 and 22, respectively.

For sealingly engaging trim cylinder 20, trim piston 116 carries two sets 123 and 125 of dual circumferential seals, each set comprising an outer seal of square cross section concentrically stacked on a more resilient seal of oval cross section to provide a close tolerance seal arrangement for substantially preventing any leakage past the trim piston. This precludes any significant drift of trim piston 116 away from its locked position for setting the on-center position of centering rod head 40. Similar sets 129 and 130 of close tolerance, dual circumferential seals are also preferably provided on centering pistons 42 and 44, respectively.

Chamber 114 is closed at its inner end by the head 22 and at its outer end by the end head 21, which is secured in place by an end cap 132 which is similar to end cap 106 at the outer end of cylinder 50. The trimming rod 17 passes through journaled and sealed aperture 134 in end head 21 and end cap 132. A set 136 of multiple seals is secured in place by the end cap 132, which may be threaded into cylinder housing 49 at its end opposite to that receiving end cap 106. An O-ring seal 138 is provided between end cap 132 and head 21, and an O-ring seal 140 is provided between end cap 106 and its corresponding end head 100. Additional circumferential seals of either circular or rectangular cross section are provided on the heads 21, 22 and 100 as indicated by the small circles without cross-sectional lines in the cross-sectional view of these heads in FIG. 3.

A slanted port 142 in the body 144 of trim valve 30 provides a combined inlet and outlet into a trim chamber 139 on one side of trim piston 116 and also into a bore 141 for receiving an extension 143 of trim piston 116. A second slanted port 145 provides a combined inlet and outlet into a trim chamber 146 on the other side of trim piston 116. The chambers 139 and 146 are arranged to receive hydraulic fluid to prevent retraction and extension, respectively, of trimming rod 17. Fluid flow through ports 142 and 145 is controlled by flow passages in trim valve body 144 as described further below. Fluid communication between ports 142 and 145 and the passages in trim valve body 144 is provided by the corresponding axial passage 147 and radial passages 148 in each of the respective securing bolts 23 and 24.

Figure 4:
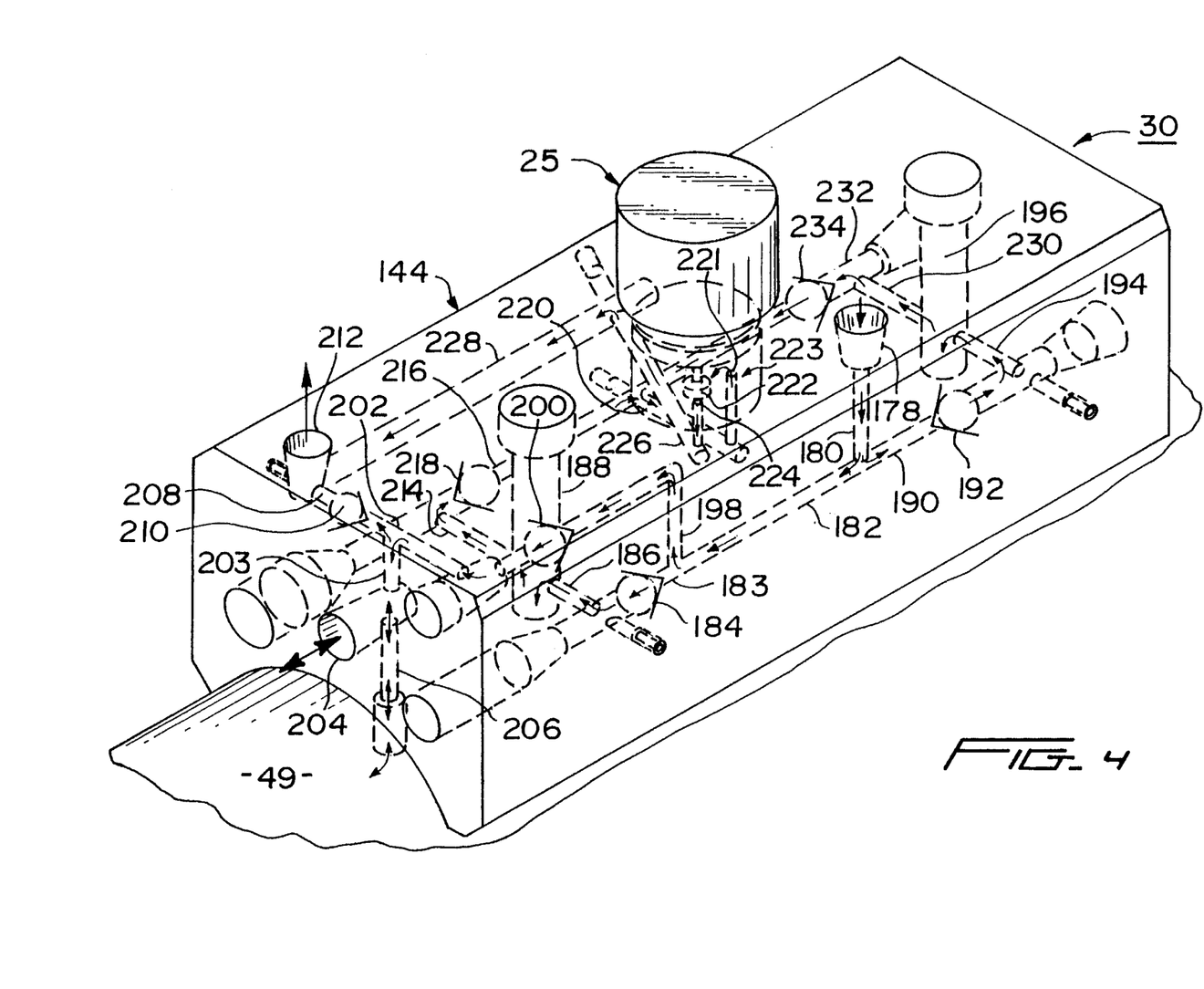
FIG. 4 is a perspective view illustrating the fluid passages and valves within the trim valve housing shown mounted on the trim cylinder in FIGS. 2 and 3; and, FIG. 5 is a schematic diagram of the hydraulic fluid system, including the fluid passages and valves of FIG. 4.
Figure 5:
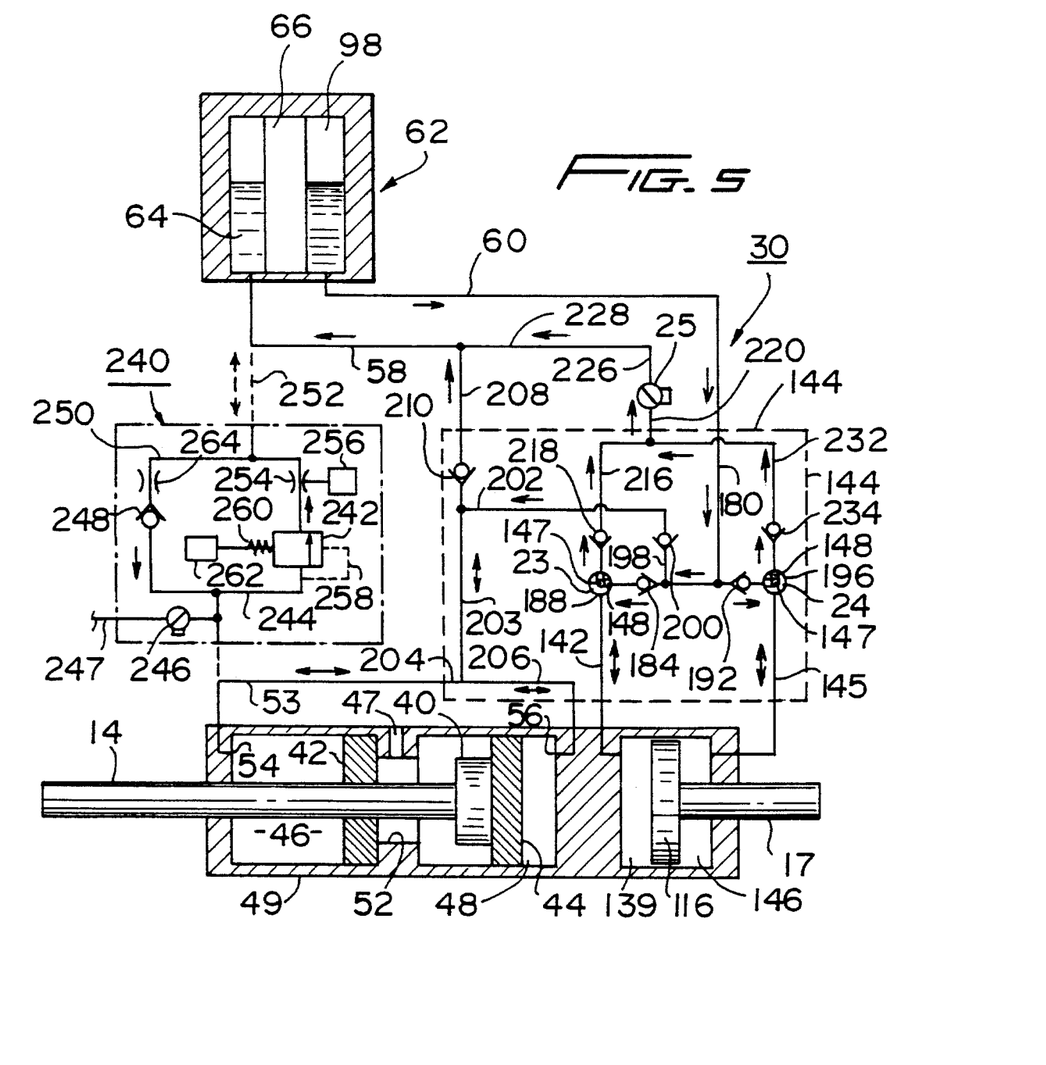

The fluid flow passages and valves in the housing 144 of trim valve assembly 30 will now be described with reference to FIGS. 4 and 5. Fluid may be supplied to or discharged from trim chambers 139 and 146 only when trim valve assembly 30 is opened by solenoid valve 25, such fluid being supplied to one trim chamber only while being discharged simultaneously from the other trim chamber.

Fluid from supply conduit 60 is supplied to the ported bolt 23 in housing bore 188 via a housing inlet 178, passages 180 and 182, a passage 183 containing a check valve 184, and a passage 186. Fluid is supplied to the ported bolt 24 in housing bore 196 via the housing inlet 178, the passage 180, a passage 190 containing a check valve 192 and a passage 194. Fluid flows into the trim chambers 139 and 146 via the radial passages 148 and the axial passage 147 in the ported bolts 23 and 24, respectively, the passage 186 being aligned with the radial passages 148 of bolt 23 and the passage 194 being aligned with the radial passages 148 of bolt 24.

When valve head 222 is lifted away from outlet 224 of solenoid valve chamber 223, fluid is discharged from trim chamber 139 to return conduit 58 via a passage at 214, a passage 216 containing a check valve 218, a passage 220, an inlet 221 into chamber 223, the outlet 224, and passages 226 and 228 leading to a housing outlet 212 connected to return conduit 58. Fluid is discharged from trim chamber 146 to return conduit 58 via a passage 230, a passage 232 containing a check valve 234 and the passage 220, from which it flows through the same passages and solenoid valve chamber elements as described above with respect to fluid discharged from trim chamber 139. Fluid flows from the trim chambers 139 and 146 via the axial passage 147 and the radial passages 148 in the ported bolts 23 and 24, respectively, the passage 214 being aligned with the radial passages 148 of bolt 23 and the passage 230 being aligned with the radial passages 148 of bolt 24.

Fluid from supply conduit 60 is supplied to the port 56 of centering chamber 48 via the inlet 178, the passages 180 and 182, a passage 198 containing a check valve 200, and passages 202, 203 and 206. The supply pathway for fluid supplied to port 54 of centering chamber 46 is the same as that for centering chamber 48, except fluid flows through a port 204 connected to conduit 53 instead of through passage 206. Fluid discharged from centering chamber 46 is returned to the passage 203 via the port 54, conduit 53 and passage 204, and fluid discharged from centering chamber 48 is returned to passage 203 via the port 56 and passage 206. From passage 203, the returned fluid flows to accumulator reservoir 64 via a passage 208 containing a check valve 210, the housing outlet 212 in trim valve housing 144 and return conduit 58.

Check valve 210 may be used in place of check valve 61 adjacent to the accumulator inlet 63 to insure that gas contaminated fluid is not returned to the centering chambers 46 and 48. However, both check valves 61 and 210 are optional and may be omitted in many instances where relatively small amounts of gas bubbles may be tolerated in the centering chambers. The multiple check valves in the trimming portion of the trim housing 144 are not optional because even relatively small amounts of gas bubbles cannot be tolerated in the trimming chambers 139 and 146 if highly precise trimming is desired.

A further option is to size passage 203 so that it functions as a flow restriction orifice to limit the rate of fluid flow into and out of centering chambers 46 and 48. The effect of such of a flow restriction in discharging fluid from the centering chambers is illustrated by the following example of centering unit operation.

The air chamber 66 of accumulator 62 may be pressurized by air to a pressure of, for example, 100 psig to provide the same pressure in each of the centering chambers 46 and 48. If the working area of each of the pistons 42 and 44 is 3.5 square inches, an accumulator pressure of 100 psig will provide a linear resistance force of 350 pounds as measured at the tie rod 19 for opposing off-center movement of rod head 40. Since many conventional steering system geometries provide a linear resistance force of about 15 to 20 pounds as measured at the tie rod, the present invention may be used to increase the resistance and re-centering forces of these steering systems by a multiple of about 5 to about 30 or more, preferably about 10 to about 25. A resistance force of 300 pounds or more is particularly effective in eliminating the adverse effects of crosswinds on large vehicles.

For a power centering compensator having the foregoing characteristics, the flow restriction passage 203 may be sized at a diameter of about one-eighth inch. This passage size should not significantly affect off-center and return to center movements of the rod head 40 during normal steering and turning maneuvers in response to movements of the vehicle steering wheel. However, excessively rapid movement of the tie rod, such as may be caused by blowout of a steerable wheel tire, is viscously dampened by the flow resistance of passage 203 so that the course of the vehicle may be safely controlled with relatively little additional steering effort by the driver. To illustrate this viscous dampening effect, it has been determined that initiation of an excessively rapid tie rod movement, as might be experienced during a tire blowout, can increase the pressure in the centering chambers from 100 psig to 200 psig, the latter applying a linear force of about 700 pounds to the tie rod.

The remotely controlled trim valve assembly 30 operates as follows. If there is a roadway pull to the right, straight ahead travel will require a compensating steering force to the left from the steering wheel to move the centering piston 44 slightly to the right away from stop 52 as illustrated in FIGS. 2 and 3. Such movement of piston 44 in its chamber 48 causes piston 42 acting against stop 52 to produce a differential pressure across trim piston 116 in trim cylinder 20. While holding the steering wheel in the position giving straight ahead travel, the trim button 26 is pushed momentarily to briefly open solenoid valve 25, which allows fluid to be discharged from trim chamber 139 and supplied to trim chamber 146 such that cylinder housing 49 moves to the right and the differential pressure across trim piston 116 is removed by equalizing the pressures in trim chambers 139 and 146. Fluid flowing out of chamber 139 follows the return flow path toward return conduit 58 as described above, and fluid supplied to trim chamber 146 follows the supply flow path from supply conduit 60 as described above.

The movement of trim piston 116 in trim cylinder 20 causes centering piston 44 to be reseated in its rest position against stop 52, centering piston 42 remaining in its seated position against stop 52 during this trimming operation. After its momentary actuation, the trim button 26 is then released to close solenoid valve 25 and thereby lock trim piston 116 in its changed position corresponding to a new on-center position in which stop 52 is realigned with rod head 40. This new on-center position of stop 52 will then maintain the vehicle steering system in a newly centered condition, which provides straight ahead travel of the vehicle that is free from the previously experienced roadway pull to the right and will be maintained even when the steering wheel is released.

As an alternative to the foregoing embodiment wherein fluid for the centering cylinders passes through the trim valve body, passages 198, 202, 203 and 208 and corresponding check valves 200 and 210 may be replaced by an alternate centering fluid system 240 providing additional power centering features. Thus, an additional level of resistance to be overcome before turning movement may be initiated is provided by a pressure differential valve 242 in a return conduit 244 also containing an orifice 254. Although accumulator pressure alone will resist off-center movement of the pistons in the absence of a pressure differential valve, this valve may be used so that the steering force required to make a turning movement away from center is substantially higher than the return force for returning the system to center upon removal of the steering force. Until pressure in one of the centering chambers exceeds the setting of valve 242, movement of both pistons is prevented by fluid trapped in the centering chambers by this valve and check valve 248 in a supply conduit 250. A solenoid operated dump valve 246, which may be actuated by switch 152, will release any residual centering chamber pressure through a drain line 247 in the event of a failure in the power steering system.

When the pressure setting of differential pressure valve 242 is reached, fluid then flows through conduit 244 and a conduit 252 into accumulator liquid chamber 64. Valve 242 is preferably of the spring biased type and dotted line 258 represents a pilot line through which centering chamber pressure is applied until it overcomes the force of a diaphragm spring 260 and opens the valve. The pressure setting of this valve can be varied by adjusting the spring tension, and the valve may include a remotely controlled solenoid 262 so that the pressure differential can be manually or automatically varied in accordance with vehicle speed.

The orifice 254 may be used to control the rate of fluid flow out of the respective centering chambers when valve 242 is open. Orifice 254 may be fixed or variable in size and in either case provides a flow resistance that varies in response to the rate of piston movement. If orifice 254 is of variable size, it may be operated by a remotely controlled solenoid 256 to make its flow restriction controllably variable in response to vehicle speed or to a manual selector. Orifice 254 may comprise a solenoid operated throttle valve or a multiported valve with different size outlet orifices. Both the orifice solenoid 256 and the valve solenoid 262 may be controlled automatically by the on-board computer 160 through the use of inputs and outputs similar to those already described for automatically controlling pressure regulator 69.

The pressurized hydraulic fluid available from the accumulator is transmitted to the centering chambers 46 and 48 through the inlet/outlet conduit 252 and supply conduit 250. This accumulator energy provides the return force for reseating pistons 42 and 44 in their retracted positions upon removal of intentional steering inputs. Should the rate of piston return to center be too rapid and cause the steering system to overshoot its center position, an orifice 264 may also be installed in supply conduit 250 to control the rate of fluid flow into the respective centering chambers. However, such flow restrictions should not prevent a relatively free return of all components to center.

Although alternative fluid system 240 is optional, the differential pressure valve 242 is an important feature because it may provide improved centering stability and steering control. The steering force may vary within the range of resistance represented by valve 242 without generating any steering movement. This valve then opens at its set point and remains open as long as a pressure differential above the set point exists between pilot line 258 and conduit 252. It will therefore remain open while a centering piston is moving away from center and will close when such movement stops because continued flow through orifice 254 will lower the pressure differential below the set point.

Thereafter, when the steering force drops below the opposing return force generated by accumulator pressure through supply conduit 250, the off-center piston returns to its retracted position as fluid flows from the accumulator through check valve 248. Differential pressure valve 242 in combination with accumulator 62 therefore provides a static resistance force greater than the dynamic resistance force provided by the accumulator alone. The term "static" is used in this specification to distinguish the variable resistance force provided by orifice 254 in response to the rate of fluid flow produced by movement of a centering piston. By comparison, the resistances provided by accumulator 62 and valve 242 are both present without fluid flow.

The particularly important trimming feature of the invention may be achieved through drive means other than the hydraulic trimming unit 16. For example, movement of trim rod 17 may be accomplished by controllably varying its position with a reversible electric motor pivotally mounted on the vehicle axle 11 in place of trimming unit 16. Such trimming arrangements are described in the my prior U.S. Pat. No. 4,418,931 and No. 4,534,577 which are incorporated herein by reference. However, the piston and cylinder trimming arrangement shown in the drawings is preferably for its precision and ability to provide a greater range of return forces.

It is also important to recognize that the centering compensators of the present invention engage the vehicle steering system at a location between the steerable wheels and the steering gear assembly from which extends the pitman arm. As a result, spurious inputs from the steering column and/or from a power steering unit are absorb by the compensator before these inputs can reach the steerable wheels. Likewise, spurious forces transmitted from the roadway are immediately absorbed in the compensator, rather than being transmitted through the entire steering assembly before encountering any stabilizing resistance from the steering wheel. As a result, the centering compensator protects the interior components of the steering assembly from the wear caused by repeated oscillations between states of tension and compression.

In the operation of roadway motor vehicles, spurious inputs may be caused by road forces acting on the vehicle wheels, environmental forces acting on the vehicle body, driver forces acting on the steering wheel, off-center bias inherent in the steering system itself, or any combination of one or more of these forces. Without the power centering compensator of the present invention, such spurious steering forces of relatively small magnitude can cause vehicle steering systems to move to one side or the other of center or to oscillate back and forth from one side to the other, thereby producing corresponding movements of the vehicle away from the desired direction of vehicular travel. The invention also may be used with other tie rod arrangements and with steering systems that do not require tie rod arrangements, such as those with only one steerable member, such as the rudder of a ship or an airplane.

The variable resistance and return force components of the invention can be used alone as a centering unit without the remote trimming features. On the other hand, the remote trimming features of the invention are useable not only with the centering unit disclosed herein, but also in combination with centering mechanisms of the prior art. Thus, the remotely operable trimming unit of the present invention can be combined with centering devices of known types to provide adjustment of the center position during vehicle operation. In addition, a number of other modifications to both the variable resistance components and the trimming components specifically described herein are possible without departing from the scope of the invention, as defined by the claims below.

What is claimed is:

1. An apparatus for positioning at least one steerable member mounted on a frame means for movement to either side of a selected position, said apparatus comprising:

resistance means for providing a resistance force resisting steering forces tending to move said steerable member to either side of said selected position, said resistance means comprising linkage means of variable length extending between said steerable member and said frame means, the length of said linkage means defining said selected position;

trim means operable for varying said selected position of said steerable member, said trim means comprising a trim piston, trim cylinder means for providing first and second trim chambers one on each side of said trim piston, and trim passage means for providing a flow of a liquid to and from each of said trim chambers, said trim piston being movable relative to said trim cylinder means to cause said liquid flow and to vary said selected position by changing the length of said linkage means; and, actuator means for operating said trim means so as to controllably vary said selected position of said steerable member from a location remote from said trim means and said steerable member, said actuator means comprising:
a source of said liquid,
supply conduit means for supplying liquid from said source to said trim passage means,
first check valve means for preventing said supplied liquid from flowing back to said source through said supply conduit means,
return conduit means for returning liquid from said trim passage means to said source,
second check valve means for preventing said returned liquid from flowing back to said trim passage means through said return conduit means,
and trim valve means operable between a closed position for preventing said liquid flow to and from each of said trim chambers and an open position for allowing said piston to move relative to said trim cylinder means, said piston movement causing said liquid flow to one of said trim chambers and said liquid flow from the other of said trim chambers, and operating means activatable from said remote location for operating said trim valve means between said closed and open positions;
wherein said liquid source includes accumulator means comprising a housing wall and an interior wall cooperating with said housing wall to define an annular reservoir for holding a supply of said liquid, an outlet for providing fluid communication between said reservoir and said supply conduit means, and an inlet for providing fluid communication between said reservoir and said return conduit means,
and wherein said outlet is peripherally spaced from said inlet around the peripheral extent of said reservoir by a distance sufficient for gas bubbles in said returned liquid to rise into a gas space above a liquid space in said reservoir and thereby be prevented from entering said outlet.

2. An apparatus according to claim 1 wherein said resistance means further comprises:
pressure cylinder means for providing a portion of said linkage means;
a first piston cooperating with said pressure cylinder means to define a first pressure chamber;
a second piston cooperating with said pressure cylinder means to define a second pressure chamber, each of said first and second pistons being arranged to move independently of the other between a retracted position and a position for compressing a fluid within its corresponding chamber;
rod means for providing another portion of said linkage means and comprising a rod head arranged for movement to either side of a neutral position corresponding to said selected position, and an elongated rod for causing said rod head to engage each of said pistons independently of the other so that movement of said rod head away from said neutral position to one side causes compressive movement of said first piston without moving said second piston and movement of said rod head away from said neutral position to the other side causes compressive movement of said second piston without moving said first piston; and
fluid means for providing a pressurized fluid in each of said first and second pressure chambers so that fluid pressure provides said resistance force by opposing movement of said steerable member toward either side of said selected position and provides a return force continuously biasing said steerable member toward said selected position during movement of said steerable member to either side of said selected position, said fluid being said liquid under a pressure provided by said accumulator means, and said liquid pressure causing said pistons to bias said rod head toward said neutral position during said compressive movements.

3. An apparatus according to claim 2 wherein said accumulator means includes means for controllably varying said liquid pressure so as to vary said resistance force and said return force.

4. An apparatus according to claim 3 wherein the interior wall of said accumulator means comprises a flexible diaphragm defining a gas chamber; and wherein said apparatus further comprises means for pressurizing said gas chamber with a gas to cause said diaphragm to pressurize the liquid in said reservoir, and means for controllably varying the pressure of said gas so as to vary said liquid pressure.

5. An apparatus according to claim 2 wherein liquid flowing out of said pressure chambers is returned to said accumulator means by said return conduit means, wherein said return conduit means comprises a third check valve means for preventing said returned liquid from flowing back to said pressure chambers through said return conduit means, and wherein said liquid is supplied to said pressure chambers via said supply conduit means.

6. An apparatus according to claim 2 further comprising means for controllably varying said resistance force.

7. An apparatus according to claim 6 wherein liquid from said accumulator means flows to and from said pressure chambers via pressure conduit means, and wherein said pressure conduit means comprises a pressure actuated valve means for preventing fluid flow from said pressure chambers until the engagement between said rod head and one of said first and second pistons produces a fluid pressure differential above said accumulator pressure by a selected amount.

8. An apparatus according to claim 7 wherein said pressure actuated valve means includes mean for controllably varying said selected amount of fluid pressure differential.

9. An apparatus according to claim 2 wherein said frame means is part of a vehicle, and said apparatus further comprises means for changing said liquid pressure so as to controllably vary said resistance force and said return force in response to the speed of said vehicle.

10. An apparatus according to claim 2 for use on a vehicle having a steering system comprising said at least one steerable member, wherein said apparatus further comprises gas pressure means for applying pressure of a pressurized gas to said liquid in the annular reservoir of said accumulator means, and control means for automatically adjusting the amount of said gas pressure in response to the speed of said vehicle.

11. An apparatus according to claim 2 for a vehicle having a power steering unit for providing steering power to said steerable member, said apparatus further comprising means for preventing pressurization of said accumulator means in the absence of steering power from said power steering unit.

12. An apparatus according to claim 1 wherein said return conduit means comprises a first return passage for receiving a first return liquid flow from said first trim chamber via said trim passage means, a second return passage for receiving a second return liquid flow from said second trim chamber via said trim passage means, and a common return passage for returning said first and second return liquid flows from said first and second return passages to said source; wherein said second check valve means comprises a check valve in said first return passage and a check valve in said second return passage; and wherein said trim valve means comprises a remotely operable stop valve arranged in said common return passage so that said first and second return liquid flows are prevented when said stop valve is closed.

13. An apparatus according to claim 12 wherein said supply conduit means comprises a first supply passage for supplying a first supply liquid flow to said first trim chamber via said trim passage means, and a second supply passage for supplying a second supply liquid flow to said second trim chamber via said trim passage means; and wherein said first check valve means comprises a check valve in said first supply passage and a check valve in said second supply passage.

14. An apparatus for positioning at least one steerable member mounted on a frame means for movement to either side of a selected position, said apparatus comprising:

resistance means for providing a resistance force resisting steering forces tending to move said steerable member to either side of said selected position, said resistance means comprising linkage means of variable length extending between said steerable member and said frame means, the length of said linkage means defining said selected position;

trim means operable for varying said selected position of said steerable member, said trim means comprising a trim piston, trim cylinder means for providing first and second trim chambers one on each side of said trim piston, and trim passage means for providing a flow of a liquid to and from each of said trim chambers, said trim piston being movable relative to said trim cylinder means to cause said liquid flow and to vary said selected position by changing the length of said linkage means; and, actuator means for operating said trim means so as to controllably vary said selected position of said steerable member from a location remote from said trim means and said steerable member, said actuator means comprising:

a source of said liquid, supply conduit means for supplying liquid from said source to said trim passage means, first check valve means for preventing said supplied liquid from flowing back to said source through said supply conduit means, return conduit means for returning liquid from said trim passage means to said source, second check valve means for preventing said returned liquid from flowing back to said trim passage means through said return conduit means, and trim valve means operable between a closed position for preventing said liquid flow to and from each of said trim chambers and an open position for allowing said piston to move relative to said trim cylinder means, said piston movement causing said liquid flow to one of said trim chambers and said liquid flow from the other of said trim chambers, and operating means activatable from said remote location for operating said trim valve means between said closed and open positions;

wherein said return conduit means comprises a first return passage for receiving a first return liquid flow from said first trim chamber via said trim passage means, a second return passage for receiving a second return liquid flow from said second trim chamber via said trim passage means, and a common return passage for returning said first and second return liquid flows from said first and second return passages to said source;

wherein said second check valve means comprises a check valve in said first return passage and a check valve in said second return passage;

and wherein said trim valve means comprises a remotely operable stop valve arranged in said common return passage so that said first and second return liquid flows are prevented when said stop valve is closed.

15. An apparatus according to claim 14 wherein said supply conduit means comprises a first supply passage for supplying a first supply liquid flow to said first trim chamber via said trim passage means, and a second supply passage for supplying a second supply liquid flow to said second trim chamber via said trim passage means; and wherein said first check valve means comprises a check valve in said first supply passage and a check valve in said second supply passage.

16. An apparatus according to claim 15 wherein said resistance means further comprises fluid means for providing said resistance force in response to fluid pressure in a pressure chamber, wherein said liquid source comprises accumulator means for pressurizing said liquid in said supply conduit means, wherein said supply conduit means supplies said pressurized liquid to said pressure chamber, and wherein said return conduit means returns said pressurized liquid from said pressure chamber to said source.

17. An apparatus according to claim 16 wherein said return conduit means further comprises a third return passage for returning a third return liquid flow from said pressure chamber to said accumulator means, wherein said second check valve means comprises a check valve in said third return passage, wherein said supply conduit means further comprises a third supply passage for supplying a third supply liquid flow to said pressure chamber, and wherein said first check valve means further comprises a check valve in said third supply passage.

18. An apparatus according to claim 14 wherein said resistance means further comprises fluid means for providing said resistance force in response to fluid pressure in a pressure chamber, wherein said liquid source comprises accumulator means for pressurizing said liquid in said supply conduit means, and wherein said supply conduit means supplies pressurized liquid to said pressure chamber.

19. An apparatus according to claim 18 wherein said resistance means further comprises:

cylinder means for providing a portion of said linkage means;

a first piston cooperating with said cylinder means to define a first pressure chamber;

a second piston cooperating with said cylinder means to define a second pressure chamber, each of said first and second pistons being arranged to move independently of the other between a retracted position and a position for compressing a fluid within its corresponding chamber;

rod means for providing another portion of said linkage means and comprising a rod head arranged for movement to either side of a neutral position corresponding to said selected position, and an elongated rod for causing said rod head to engage each of said pistons independently of the other so that movement of said rod head away from said neutral position to one side causes compressive movement of said first piston without moving said second piston and movement of said rod head away from said neutral position to the other side causes compressive movement of said second piston without moving said first piston; and fluid means for providing a pressurized fluid in each of said first and second pressure chambers so that fluid pressure provides said resistance force by opposing movement of said steerable member toward either side of said selected position and provides a return force continuously biasing said steerable member toward said selected position during movement of said steerable member to either side of said selected position, said fluid being pressurized liquid provided from said supply conduit means, and said pressurized liquid causing said pistons to bias said rod head toward said neutral position during said compressive movements.

20. An apparatus according to claim 14 wherein said liquid source includes accumulator means comprising a housing wall and an interior wall cooperating with said housing wall to define an annular reservoir for holding a supply of said liquid, an outlet for providing fluid communication between said reservoir and said supply conduit means, and an inlet for providing fluid communication between said reservoir and said return conduit means, said outlet being peripherally spaced from said inlet around the peripheral extent of said reservoir by a distance sufficient for gas bubbles in said returned liquid to rise into a gas space above a liquid space in said reservoir and thereby be prevented from entering said outlet.

21. An apparatus according to claim 20 wherein the interior wall of said accumulator means comprises a flexible diaphragm defining a gas chamber; and wherein said apparatus further comprises means for pressurizing said gas chamber with a gas to cause said diaphragm to pressurize the liquid in said reservoir, and means for controllably varying the pressure of said gas so as to vary said liquid pressure.

22. An apparatus for positioning at least one steerable member mounted on a frame means for movement to either side of a selected position, and including resistance means for providing a resistance force resisting steering forces tending to move said steerable member to either side of said selected position, said resistance means comprising:

linkage means extending between said steerable member and said frame means and having a length defining said selected position, fluid means for providing said resistance force in response to fluid pressure of a pressurized liquid in a pressure chamber, and accumulator means for providing a source of said pressurized liquid;

said fluid means comprising supply conduit means for supplying pressurized liquid from said source to said pressure chamber, first check valve means for preventing said supplied liquid from flowing back to said source through said supply conduit means, return conduit means for returning liquid from said pressure chamber to said source, and second check valve means for preventing said returned liquid from flowing back to said pressure chamber through said return conduit means;

and said accumulator means comprising a housing wall and an interior wall cooperating with said housing wall to define an annular reservoir for holding a supply of said liquid, an outlet for providing fluid communication between said reservoir and said supply conduit means, and an inlet for providing fluid communication between said reservoir and said return conduit means, said outlet being peripherally spaced from said inlet around the peripheral extent of said reservoir by a distance sufficient for gas bubbles in said returned liquid to rise into a gas space above a liquid space in said reservoir and thereby be prevented from entering said outlet.

23. An apparatus according to claim 22 wherein said accumulator means includes means for controllably varying said liquid pressure so as to vary said resistance force.

24. An apparatus according to claim 22 wherein said resistance means further comprises:

pressure cylinder means for providing a portion of said linkage means;

a first piston cooperating with said pressure cylinder means to define a first pressure chamber;

a second piston cooperating with said pressure cylinder means to define a second pressure chamber, each of said first and second pistons being arranged to move independently of the other between a retracted position and a position for compressing a fluid within its corresponding chamber; and rod means for providing another portion of said linkage means and comprising a rod head arranged for movement to either side of a neutral position corresponding to said selected position, and an elongated rod for causing said rod head to engage each of said pistons independently of the other so that movement of said rod head away from said neutral position to one side causes compressive movement of said first piston without moving said second piston and movement of said rod head away from said neutral position to the other side causes compressive movement of said second piston without moving said first piston;

wherein said fluid means provides a pressurized liquid in each of said first and second pressure chambers so that fluid pressure provides said resistance force by opposing movement of said steerable member toward either side of said selected position, and fluid pressure causes said pistons to bias said rod head toward said neutral position during said compressive movements and thereby provides a return force continuously biasing said steerable member toward said selected position during movement of said steerable member to either side of said selected position.

25. An apparatus according to claim 24 wherein said accumulator means includes means for controllably varying said liquid pressure so as to vary said resistance force and said return force.

26. An apparatus according to claim 22 wherein the interior wall of said accumulator means comprises a flexible diaphragm defining a gas chamber, and wherein said apparatus further comprises means for pressurizing said gas chamber with a gas to cause said diaphragm to pressurize the liquid in said reservoir.

27. An apparatus according to claim 26 further compris ing control means for controllably varying the pressure of said gas so as to vary said liquid pressure.

28. An apparatus according to claim 26 for use on a vehicle having a steering system comprising said at least one steerable member, wherein said control means comprises means for automatically adjusting the amount of said gas pressure in response to the speed of said vehicle.

* * * * *